US007181596B2

(12) United States Patent
Henry et al.

(10) Patent No.: US 7,181,596 B2
(45) Date of Patent: Feb. 20, 2007

(54) APPARATUS AND METHOD FOR EXTENDING A MICROPROCESSOR INSTRUCTION SET

(75) Inventors: G. Glenn Henry, Austin, TX (US); Rodney E. Hooker, Austin, TX (US); Terry Parks, Austin, TX (US)

(73) Assignee: IP-First, LLC, Fremont, CA (US)

(*) Notice: Subject to any disclaimer, the term of this patent is extended or adjusted under 35 U.S.C. 154(b) by 521 days.

(21) Appl. No.: 10/144,595

(22) Filed: May 9, 2002

(65) Prior Publication Data
US 2003/0154359 A1 Aug. 14, 2003

Related U.S. Application Data
(60) Provisional application No. 60/356,420, filed on Feb. 12, 2002.

(51) Int. Cl.
G06F 9/30 (2006.01)
G06F 9/00 (2006.01)

(52) U.S. Cl. ........................................ 712/209; 712/218
(58) Field of Classification Search ................ 712/209, 712/210, 212, 226, 218; 711/108, 102
See application file for complete search history.

(56) References Cited

U.S. PATENT DOCUMENTS

| | | |
|---|---|---|
| 3,657,705 A | 4/1972 | Mekota et al. |
| 4,064,554 A | 12/1977 | Tubbs |
| 4,217,638 A | 8/1980 | Namimoto et al. |
| 4,547,849 A | 10/1985 | Louie et al. |
| 5,029,069 A | 7/1991 | Sakamura |
| 5,142,679 A | 8/1992 | Owaki et al. |
| 5,218,712 A | 6/1993 | Cutler et al. |
| 5,448,744 A | 9/1995 | Eifert et al. |

(Continued)

FOREIGN PATENT DOCUMENTS

| | | |
|---|---|---|
| EP | 0550289 A | 7/1993 |
| EP | 0942359 A | 9/1999 |
| EP | 0947919 A | 10/1999 |
| WO | WO-9722922 A1 | 6/1997 |

OTHER PUBLICATIONS

60/369,586.*
Haitham Akkary; Memory System for ordering Load and Store Instructions in a Processor that Performs Out–o-f–Order Multithread Execution; US2002/0194457; Dec. 19, 2002.
Paap et al., "Power PC™; A Performance Architecture," COMPCON Spring '93, Digest of Papers, San Francisco, CA, IEEE Computer Society, Feb. 22, 1993, pp. 104–108.
Silberman et al. *An Architectural Framework for Supporting Heterogenous Instruction–Set Architectures.* Computer, IEEE Computer Society, Long Beach, CA. US vol. 26, No. 6 Jun. 1, 1993. Pages 39–56. ISSN: 0018–0162.
Intel Architecture Software Developer's Manual, vol. 2: Instruction Set Reference, 1999. pages 2–1 to 2–4, 3–332, 3–353 and B25.

*Primary Examiner*—Henry W. H. Tsai
(74) *Attorney, Agent, or Firm*—Richard K. Huffman; James W. Huffman

(57) ABSTRACT

An apparatus and method for extending a microprocessor instruction set is provided. The apparatus includes translation logic and extended execution logic. The translation logic translates an extended instruction into corresponding micro instructions. The extended instruction has an extended prefix and an extended instruction tag. The extended prefix directs that an architectural extension be employed in the execution of an operation prescribed by the extended instruction. The extended instruction tag indicates the extended instruction prefix, where the extended instruction tag is an otherwise architecturally specified opcode within the microprocessor instruction set. The extended execution logic is coupled to the translation logic, and receives the corresponding micro instructions, and employs the architectural extension in the execution of the operation.

29 Claims, 5 Drawing Sheets

U.S. PATENT DOCUMENTS

| | | |
|---|---|---|
| 5,471,595 A | 11/1995 | Yagi et al. |
| 5,481,684 A | 1/1996 | Richter et al. |
| 5,751,996 A | 5/1998 | Glew et al. |
| 5,768,574 A | 6/1998 | Dutton et al. |
| 5,778,220 A | 7/1998 | Abramson et al. |
| 5,796,973 A | 8/1998 | Witt et al. |
| 5,822,778 A | 10/1998 | Dutton et al. |
| 5,826,089 A | 10/1998 | Ireton |
| 5,857,103 A | 1/1999 | Grove |
| 5,875,342 A | 2/1999 | Temple |
| 5,937,199 A | 8/1999 | Temple |
| 5,991,872 A | 11/1999 | Shiraishi et al. |
| 6,014,735 A | 1/2000 | Chennupaty et al. |
| 6,029,222 A | 2/2000 | Kamiya |
| 6,058,472 A | 5/2000 | Panwar et al. |
| 6,085,312 A | 7/2000 | Abdallah et al. |
| 6,157,996 A | 12/2000 | Christie et al. |
| 6,199,155 B1 * | 3/2001 | Kishida et al. ............. 712/210 |
| 6,230,259 B1 * | 5/2001 | Christie et al. ............. 712/228 |
| 6,317,822 B1 | 11/2001 | Padwekar |
| 6,351,806 B1 | 2/2002 | Wyland |
| 6,434,693 B1 | 8/2002 | Senter et al. |
| 6,456,891 B1 * | 9/2002 | Kranich et al. ................ 700/2 |
| 6,549,999 B2 | 4/2003 | Kishida et al. |
| 6,560,694 B1 | 5/2003 | McGrath et al. |
| 6,581,154 B1 | 6/2003 | Zaidi |
| 6,647,488 B1 | 11/2003 | Takeno et al. |
| 6,823,414 B2 | 11/2004 | Radhakrishna |
| 6,883,053 B2 | 4/2005 | Shinagawa et al. |
| 2001/0013870 A1 | 8/2001 | Pentkovski et al. |
| 2003/0159009 A1 | 8/2003 | Henry et al. |
| 2003/0159020 A1 | 8/2003 | Henry et al. |
| 2003/0172252 A1 | 9/2003 | Henry et al. |
| 2003/0188129 A1 | 10/2003 | Henry et al. |
| 2003/0188130 A1 | 10/2003 | Henry et al. |
| 2003/0188131 A1 | 10/2003 | Henry et al. |
| 2003/0188133 A1 | 10/2003 | Henry et al. |
| 2003/0188140 A1 | 10/2003 | Henry et al. |
| 2003/0196077 A1 | 10/2003 | Henry et al. |
| 2003/1881130 | 10/2003 | Henry et al. |
| 2003/0221091 A1 | 11/2003 | Henry et al. |
| 2005/0102492 A1 | 5/2005 | Henry et al. |
| 2005/0188179 A1 | 8/2005 | Henry et al. |

* cited by examiner

*Microprocessor Instruction Format*

Fig. 3

*Extended Instruction Format*

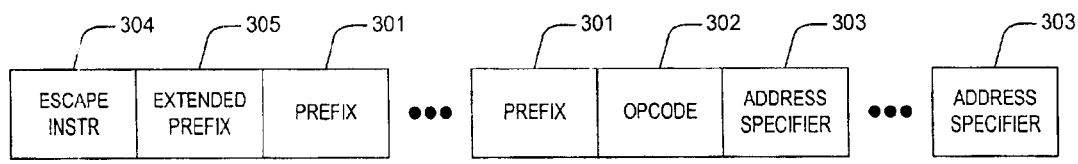

Fig. 4

*8-Bit Extended Prefix Map*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | E00 | E01 | E02 | E03 | E04 | E05 | E06 | E07 | E08 | E09 | E0A | E0B | E0C | E0D | E0E | E0F |
| 1 | E10 | E11 | E12 | E13 | E14 | E15 | E16 | E17 | E18 | E19 | E1A | E1B | E1C | E1D | E1E | E1F |
| 2 | E20 | E21 | E22 | E23 | E24 | E25 | E26 | E27 | E28 | E29 | E2A | E2B | E2C | E2D | E2E | E2F |
| 3 | E30 | E31 | E32 | E33 | E34 | E35 | E36 | E37 | E38 | E39 | E3A | E3B | E3C | E3D | E3E | E3F |
| 4 | E40 | E41 | E42 | E43 | E44 | E45 | E46 | E47 | E48 | E49 | E4A | E4B | E4C | E4D | E4E | E4F |
| 5 | E50 | E51 | E52 | E53 | E54 | E55 | E56 | E57 | E58 | E59 | E5A | E5B | E5C | E5D | E5E | E5F |
| 6 | E60 | E61 | E62 | E63 | E64 | E65 | E66 | E67 | E68 | E69 | E6A | E6B | E6C | E6D | E6E | E6F |
| 7 | E70 | E71 | E72 | E73 | E74 | E75 | E76 | E77 | E78 | E79 | E7A | E7B | E7C | E7D | E7E | E7F |
| 8 | E80 | E81 | E82 | E83 | E84 | E85 | E86 | E87 | E88 | E89 | E8A | E8B | E8C | E8D | E8E | E8F |
| 9 | E90 | E91 | E92 | E93 | E94 | E95 | E96 | E97 | E98 | E99 | E9A | E9B | E9C | E9D | E9E | E9F |
| A | EA0 | EA1 | EA2 | EA3 | EA4 | EA5 | EA6 | EA7 | EA8 | EA9 | EAA | EAB | EAC | EAD | EAE | EAF |
| B | EB0 | EB1 | EB2 | EB3 | EB4 | EB5 | EB6 | EB7 | EB8 | EB9 | EBA | EBB | EBC | EBD | EBE | EBF |
| C | EC0 | EC1 | EC2 | EC3 | EC4 | EC5 | EC6 | EC7 | EC8 | EC9 | ECA | ECB | ECC | ECD | ECE | ECF |
| D | ED0 | ED1 | ED2 | ED3 | ED4 | ED5 | ED6 | ED7 | ED8 | ED9 | EDA | EDB | EDC | EDD | EDE | EDF |
| E | EE0 | EE1 | EE2 | EE3 | EE4 | EE5 | EE6 | EE7 | EE8 | EE9 | EEA | EEB | EEC | EED | EEE | EEF |
| F | EF0 | EF1 | EF2 | EF3 | EF4 | EF5 | EF6 | EF7 | EF8 | EF9 | EFA | EFB | EFC | EFD | EFE | EFF |

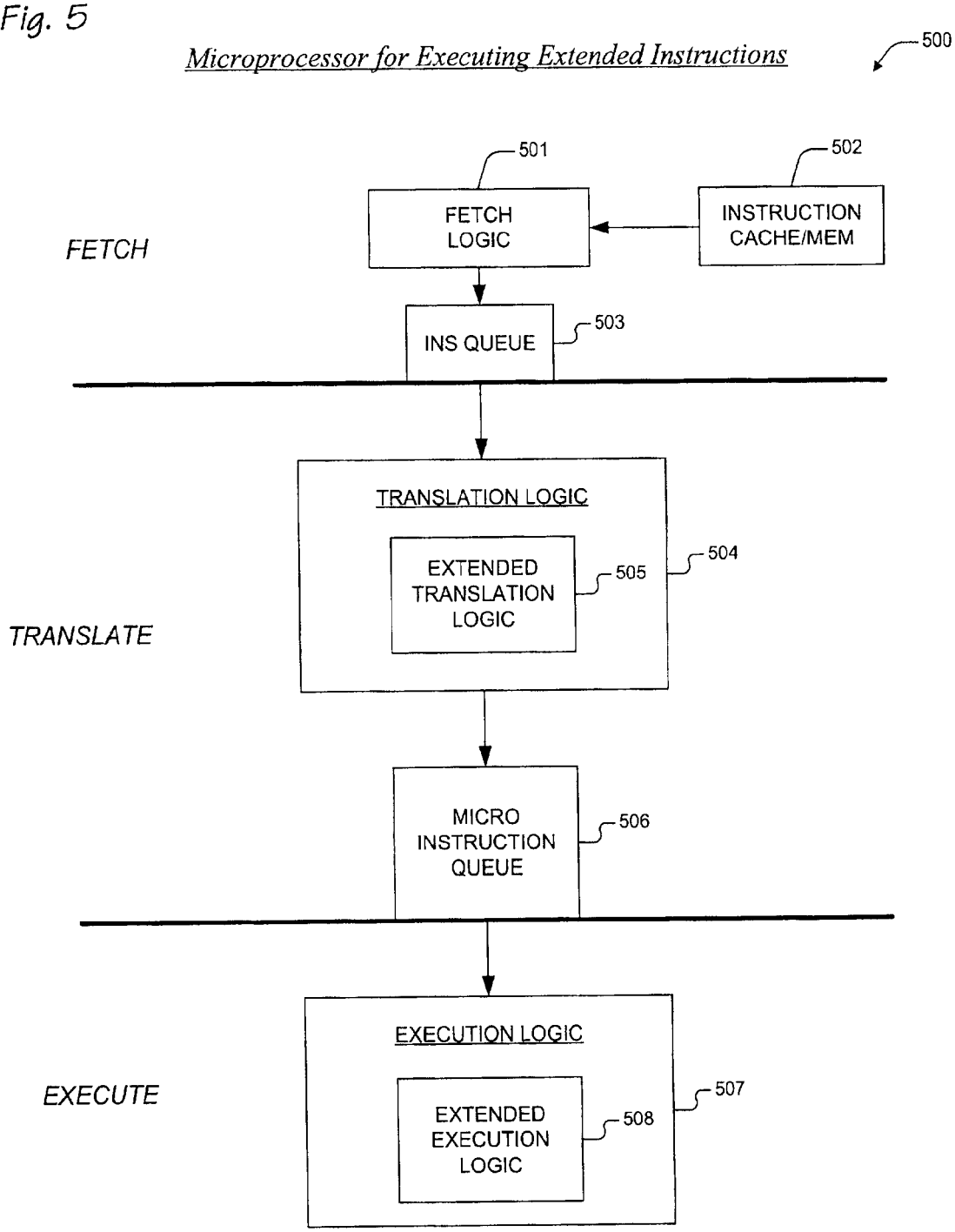

APPARATUS AND METHOD FOR EXTENDING A MICROPROCESSOR INSTRUCTION SET

CROSS-REFERENCE TO RELATED APPLICATIONS

This application claims priority based on U.S. Provisional Application, Ser. No. 60/356,420, filed Feb. 12, 2002, entitled "APPARATUS AND METHOD FOR EXTENDING A MICROPROCESSOR INSTRUCTION SET."

This application is related to the following co-pending U.S. patent applications, which are filed on the same day as this application, and which have a common assignee and common inventors.

| SERIAL NUMBER | TITLE |
| --- | --- |
| 10/14459 | APPARATUS AND METHOD FOR CONDITIONAL INSTRUCTION EXECUTION |
| 10/144593 | APPARATUS AND METHOD FOR SELECTIVE CONTROL OF CONDITION CODE WRITE BACK |
| 10/144590 | MECHANISM FOR EXTENDING THE NUMBER OF REGISTERS IN A MICROPROCESSOR |
| 10/144589 | APPARATUS AND METHOD FOR SELECTIVE CONTROL OF RESULTS WRITE BACK |

BACKGROUND OF THE INVENTION

1. Field of the Invention

This invention relates in general to the field of microelectronics, and more particularly to a technique for incorporating architectural features into a microprocessor architecture beyond those provided for by the microprocessor's instruction set architecture.

2. Description of the Related Art

Since microprocessors were fielded in the early 1970's, their use has grown exponentially. Originally employed in the scientific and technical fields, microprocessor use has gravitated from those specialty fields into commercial consumer fields that include products such as desktop and laptop computers, video game controllers, and a host of other common household and business devices.

Along with this explosive growth in use over the past 30 years, the art has experienced a corresponding technology pull that is characterized by an escalating demand for increased speed, expanded addressing capabilities, faster memory accesses, larger operand size, more operations (e.g., floating point, single-instruction multiple data (SIMD), conditional moves, etc.), and added specialty operations (e.g., multi-media operations). This technology pull has resulted in an incredible number of advances in the art which have been incorporated in microprocessor designs such as extensive pipelining, super-scalar architectures, cache structures, out-of-order processing, burst access, branch predication, and speculative execution. Quite frankly, a present day microprocessor is an amazingly complex and capable machine in comparison to its 30-year-old predecessors.

But unlike many other products, there is another very important factor that has constrained, and continues to constrain, the evolution of microprocessor architecture. This factor, legacy compatibility, moreover accounts for a great deal of complexity in a present day microprocessor. For market-driven reasons, many producers have opted to incorporate new architectural features into updated microprocessor designs, but at the same time in these newer products they choose to retain all of the capabilities that are required to insure compatibility with older, so-called legacy application programs.

Nowhere has this legacy compatibility burden been more noticeable than can be seen in the development history of x86-compatible microprocessors. It is well known that a present day virtual-mode, 32-/16-bit x86 microprocessor is still capable of executing 8-bit, real-mode, application programs which were produced during the 1980's. And those skilled in the art will also acknowledge that a significant amount of corresponding architectural "baggage" is carried along in the x86 architecture for the sole purpose of supporting compatibility with legacy applications and operating modes. Yet, while in the past developers have been able to incorporate newly developed architectural features into existing instruction set architectures, the means whereby use of these features is enabled-programmable instructions-are becoming scarce. More succinctly, there are no more "spare" instructions in certain instruction sets of interest that provide designers with a means to incorporate newer features into an existing architecture.

In the x86 instruction set architecture, for example, there are no undefined 1-byte opcode states that have not already been used. All 256 opcode states in the primary 1-byte x86 opcode map are taken up with existing instructions. As a result, x86 microprocessor designers must presently make a choice between providing new features and abandoning legacy compatibility. If new programmable features are to be provided, then they must be assigned to opcode states. And if spare opcode states do not remain in an existing instruction set architecture, then some of the existing opcode states must be redefined to provide for the new features. Thus, legacy compatibility is sacrificed in order to provide for new feature growth.

What is needed is a technique that allows new architectural features to be incorporated into an existing microprocessor instruction set architecture that has a completely populated opcode structure, where the technique retains legacy application compatibility.

SUMMARY OF THE INVENTION

The present invention, among other applications, is directed to overcoming these and other problems and disadvantages of the prior art. The present invention provides a superior technique for extending a microprocessor instruction set beyond its current capabilities. In one embodiment, apparatus for extending a microprocessor instruction set is provided. The apparatus includes translation logic and extended execution logic. The translation logic translates an extended instruction into corresponding micro instructions. The extended instruction has an extended prefix and an extended instruction tag. The extended prefix directs that an architectural extension be employed in the execution of an operation prescribed by the extended instruction. The extended instruction tag indicates the extended instruction prefix, where the extended instruction tag is an otherwise architecturally specified opcode within the microprocessor instruction set, and where the extended instruction tag includes opcode F1 (ICE BKPT) in the x86 instruction set. The extended execution logic is coupled to the translation logic, and receives the corresponding micro instructions, and employs the architectural extension in the execution of the operation.

One aspect of the present invention contemplates, in a microprocessor, an instruction extending mechanism. The mechanism has an instruction extension and a translator. The instruction extension directs the microprocessor to utilize an extended architecture feature during execution of a specified operation, where the instruction extension comprises one of the instructions in an instruction set architecture followed by an n-bit extended features prefix. The one of the instructions indicates the instruction extension and the n-bit extended features prefix indicates the extended architecture feature. In addition, the one of the instructions includes instruction ICE BKPT (i.e., opcode F1) in the x86 instruction set architecture. The translator receives the instruction extension, and generates a sequence of micro instructions. The sequence directs extended execution logic to utilize the extended architecture feature during execution of the specified operation.

Another aspect of the present invention comprehends an instruction set extension apparatus. The instruction set extension apparatus includes an escape tag and an extended features specifier. The escape tag is received by a microprocessor translator, and indicates that accompanying parts of a corresponding instruction prescribe an extended operation to be performed by a microprocessor, where the escape tag is an existing instruction within a microprocessor instruction set, and where the existing instruction includes instruction ICE BKPT (i.e., opcode F1) in the x86 microprocessor instruction set. The extended features specifier is coupled to the escape tag and is one of the accompanying parts. The extended features specifier prescribes a supplemental portion of the extended operation. The supplemental portion is supplemental to that provided for by the microprocessor instruction set.

A further aspect of the present invention provides a method for extending a microprocessor instruction set. The method includes providing an extended instruction, the extended instruction including an extended tag along with an extended prefix, where the extended tag is one of the instructions in the microprocessor instruction set, and where the providing includes using the one of the instructions from the x86 microprocessor instruction set as the extended tag, and the using includes selecting the x86 ICE BKPT (i.e., opcode F1) instruction as the extended tag; prescribing, via the extended prefix and remaining parts of the extended instruction, an extended operation to be performed, where the extended operation employs an architectural feature of a microprocessor that cannot be prescribed by the instructions in the microprocessor instruction set; and employing the architectural feature in execution of the extended operation.

BRIEF DESCRIPTION OF THE DRAWINGS

These and other objects, features, and advantages of the present invention will become better understood with regard to the following description, and accompanying drawings where:

FIG. 3 is a block diagram featuring an extended instruction format according to the present invention;

FIG. 4 is a table showing how extended architectural features are mapped to logic states of bits in an 8-bit extended prefix embodiment according to the present invention;

FIG. 5 is a block diagram illustrating a pipeline microprocessor for executing extended instructions according to the present invention;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles discussed herein may be applied to other embodiments. Therefore, the present invention is not intended to be limited to the particular embodiments shown and described herein, but is to be accorded the widest scope consistent with the principles and novel features herein disclosed.

Figures 1, 2:
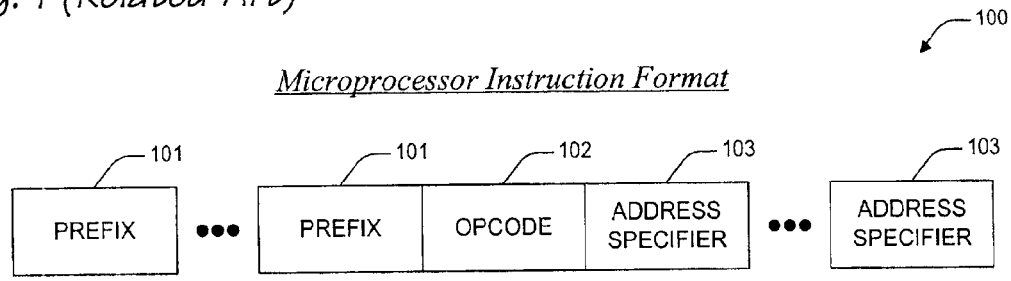
FIG. 1 is a block diagram illustrating a related art microprocessor instruction format.
FIG. 2 is a table depicting how instructions in an instruction set architecture are mapped to logic states of bits in an opcode byte within the instruction format of FIG. 1.

In view of the above background discussion on the techniques employed within present day microprocessors to extend the architectural features of those microprocessors beyond the capabilities of their associated instruction sets, a related art example will now be discussed with reference to FIGS. 1–2. The discussion highlights the dilemma that microprocessor designers routinely face where, on the one hand, they desire to incorporate more recently developed architectural features into a microprocessor design and where, on the other hand, they wish to retain the capability to execute legacy application programs. In the example of FIGS. 1–2, a fully populated opcode map rules out the possibility of adding new opcodes to the exemplary architecture, thus compelling the designers to choose either to incorporate the new features and sacrifice legacy compatibility to some degree, or to forego more recent architectural advances altogether in favor of maintaining the microprocessor's compatibility with older application programs. Following the related art discussion, a discussion of the present invention will be provided with reference to FIGS. 3–6. By identifying and exploiting an existing, but unemployed, opcode as a prefix tag for an extended instruction that follows, the present invention enables microprocessor designers to overcome the limitations of completely full instruction set architectures, thereby allowing them to provide extended architectural features while at the same time retaining compatibility with legacy application programs.

Turning to FIG. 1, a block diagram is presented illustrating a related art microprocessor instruction format 100. The related art instruction 100 has a variable number of data entities 101–103, each set to a specified value, that together make up a specific instruction 100 for a microprocessor. The specific instruction 100 directs the microprocessor to perform a specific operation such as adding two operands together, or moving an operand from memory to a register within the microprocessor. In general, an opcode entity 102 within the instruction 100 prescribes the specific operation to be performed, and optional address specifier entities 103 follow the opcode 101 prescribing additional information about the specific operation such as how the operation is to be performed, where the operands are located, etc. The instruction format 100 additionally allows a programmer to prefix an opcode 102 with prefix entities 101. The prefixes 101 direct the application of specified architectural features during the execution of the specific operation prescribed by the opcode 102. In general, these architectural features span the breadth of operations that can be prescribed by any of the opcodes 102 in the instruction set. For example, prefixes 101 exist today in a number of microprocessors that can cause operations to be executed using different size operands (e.g., 8-bit, 16-bit, 32-bit). And while many of these processors are programmed to a default operand size (say, 32-bit), prefixes 101 are provided in their respective instruction sets that enable programmers to selectively override the default operand size (say, to perform 16-bit operations) on an instruction-by-instruction basis. Selectable operand size is merely one example of an architectural feature that spans a significant number of operations (e.g., add, subtract, multiply, Boolean logic, etc.) specifiable by opcodes 102 within many present day microprocessors.

One well-known instance of the instruction format 100 shown in FIG. 1 is the x86 instruction format 100, which is employed by all present day x86-compatible microprocessors. More specifically, the x86 instruction format 100 (also known as the x86 instruction set architecture 100) uses 8-bit prefixes 101, 8-bit opcodes 102, and 8-bit address specifiers 103. The x86 architecture 100 has several prefixes 101 as well, two of which override default address/data sizes of an x86 microprocessor (i.e., opcode states 66H and 67H), another which directs the microprocessor to interpret a following opcode byte 102 according to different translation rules (i.e., prefix value 0FH, which causes translation to be performed according to the so-called 2-byte opcode rules), and others which cause particular operations to be repeated until some criteria is satisfied (i.e., the REP opcodes: F0H, F2H, and F3H).

Referring now to FIG. 2, a table 200 is presented depicting how instructions 201 in an instruction set architecture are mapped to logic states of bits in an opcode byte 102 within the instruction format of FIG. 1. The table 200 presents an exemplary 8-bit opcode map 200 that associates up to 256 values of an 8-bit opcode entity 102 with corresponding microprocessor opcode instructions 201. The table 200 maps a particular value of an opcode entity 102, say value 02H, to a corresponding opcode instruction 201 (i.e., instruction 102). In the case of the x86 opcode map, it is well known in the art that opcode value 14H is mapped to the x86 Add With Carry (ADC) instruction, which directs that an 8-bit immediate operand be added to the contents of architectural register AL. One skilled in the art will also appreciate that the x86 prefixes 101 alluded to above (i.e., 66H, 67H, 0FH, F0H, F2H, and F3H) are actually opcode values 201 that contextually specify the application of certain architectural extensions to the operation prescribed by a following opcode entity 102. For example, preceding opcode 14H (normally, the ADC opcode discussed above) with prefix 0FH results in an x86 processor executing an Unpack and Interleave Low Packed Single-Precision Floating-Point Values (UNPCKLPS) operation instead of the Add With Carry (ADC). Features such as described in this x86 example are enabled in part in a present day microprocessor because instruction translation/decoding logic in the microprocessor interprets the entities 101–103 of an instruction 100 in order. Hence, the use of specific opcode values as prefixes 101 in instruction set architectures has, in past times, allowed microprocessor designers to incorporate a significant number of advanced architectural features into a complying microprocessor design without disadvantageously impacting the execution of older programs which do not employ those specific opcode states. For example, a legacy program that never uses x86 opcode 0FH will still run on a present day x86 microprocessor. And a newer application program, by employing x86 opcode 0FH as a prefix 101, can utilize a substantial number of x86 architectural features such as single instruction multiple data (SIMD) operations, conditional move operations, and etc.

Notwithstanding the fact that architectural features have been provided for in the past by designating available/spare opcode values 201 as prefixes 101 (also known as architectural feature tags/indicators 101 or escape instructions 101), many instruction set architectures 100 have run into a brick wall in terms of providing enhancements for a very straightforward reason: all of the available/spare opcode values have been used up, that is, all of the opcode values in the opcode map 200 have been architecturally specified. When all of the available values have been assigned as either opcode entities 102 or prefix entities 101, then there are no more opcode values left to provide for the incorporation of new features. This significant problem exists in many microprocessor architectures today and consequently forces designers to choose between adding architectural features to a design and retaining compatibility with older programs.

It is notable that the instructions 201 shown in FIG. 2 are depicted generically (i.e., I24, I86) rather than specifically (i.e., Add With Carry, Subtract, Exclusive-OR). This is because fully occupied opcode maps 200 are presently precluding the incorporation of more recent architectural advances in a number of different microprocessor architectures. And although an 8-bit opcode entity 102 is alluded to in the example of FIG. 2, one skilled in the art will appreciate that the specific size of the opcode 102 is irrelevant in any sense other than its use as a specific case to teach the problem of a full opcode structure 200. Accordingly, a full 6-bit opcode map would have 64 architecturally specified opcodes/prefixes 201 and would provide no available/spare opcode values for expansion.

One alternative short of entirely obliterating an instruction set and replacing it with a new format 100 and opcode map 200 is to substitute new instruction meanings for only a subset of existing opcodes 201, say opcodes 40H through 4FH in FIG. 2. Under this hybrid technique, a conforming microprocessor is provided with means to operate in a legacy-compatible mode, where opcodes 40H–4FH are interpreted according to legacy rules, or to operate in an enhanced mode, where opcodes 40H–4FH are interpreted according to enhanced architectural rules. This technique does allow designers to incorporate new features into a design, however, disadvantages prevail when the conforming microprocessor is running in an enhanced mode because it excludes execution of any application program that uses opcodes 40H–4FH. Hence, from the standpoint of retaining legacy compatibility, the legacy-compatible/enhanced mode technique is unacceptable.

The present inventors, however, have noted the use of opcodes 201 in instruction sets 200 having fully-populated opcode spaces over the gamut of application programs composed for execution on compliant microprocessors, and they have observed that there are some instructions 202 which, although they are architecturally specified, are not employed within application programs that are capable of being executed by the microprocessors. Instruction IF1 202 is depicted in FIG. 2 as such an example of this phenomenon. In fact, the same opcode value 202 (i.e., F1H) maps to a valid instruction 202 that is not used in the x86 instruction set architecture. While the unused x86 instruction 202 is a valid x86 instruction 202 that directs an architecturally specified operation on an x86 microprocessor, it is not employed in any application program that can be executed on any present day x86 microprocessor. The particular x86 instruction 202 is called In Circuit Emulation Breakpoint (i.e., ICE BKPT, opcode value F1H), and was formerly employed exclusively in a class of microprocessor emulation equipment that no longer exists today. ICE BKPT 202 was never employed in an application program outside of an in-circuit emulator, and the form of in-circuit emulation equipment that formerly employed ICE BKPT 202 no longer exists. Hence, in the x86 case, the present inventors have identified a means within a completely occupied instruction set architecture 200 whereby they can exploit a valid, yet unused, opcode 202 to allow for the incorporation of advanced architectural features in a microprocessor design without sacrificing legacy compatibility. In a fully-occupied instruction set architecture 200, the present invention employs an architecturally specified, yet unemployed, opcode 202 as a indicator tag for in an n-bit prefix that follows, thus allowing microprocessor designers to incorporate up to $2^n$ more recently developed architectural features into a microprocessor design, while concurrently retaining complete compatibility with all legacy software. The present invention will now be discussed with reference to FIGS. 3–6.

Turning to FIG. 3, a block diagram is presented featuring an extended instruction format 300 according to the present invention. Very much like the format 100 discussed with reference to FIG. 1, the extended instruction format 300 has a variable number of data entities 301–305, each set to a specified value, that together make up a specific instruction 300 for a microprocessor. The specific instruction 300 directs the microprocessor to perform a specific operation such as adding two operands together, or moving an operand from memory to a register within the microprocessor. In general, an opcode entity 302 in the instruction 300 prescribes the specific operation to be performed, and optional address specifier entities 303 follow the opcode 302 prescribing additional information about the specific operation such as how the operation is to be performed, where the operands are located, etc. The instruction format 300 also allows a programmer to prefix an opcode 302 with prefix entities 301, which direct the application of existing architectural features during the execution of the specific operation prescribed by the opcode 302.

The extended instruction 300 according to the present invention, however, is a superset of the instruction format 100 described above with reference to FIG. 1, having two additional entities 304, 305 which are optionally provided as an instruction extension to precede all remaining entities 301–303 in a formatted extended instruction 300. The purpose of the two additional entities 304, 305 is to enable/disable a plurality of architectural features which would otherwise be not specifiable within a fully populated instruction set architecture. The optional entities 304, 305 are an extended instruction tag 304 and an extended prefix 305. The extended instruction tag 305 is an otherwise architecturally specified opcode within a microprocessor instruction set. In an x86 embodiment, the extended instruction tag 304, or escape tag 304, is opcode state F1H, the formerly used ICE BKPT instruction. The escape tag 304 indicates to microprocessor logic that the extended prefix 305, or extended features specifier 305, follows, where the extended features specifier 305 directs that an architectural extension be employed in the execution of an operation prescribed by the extended instruction 300. In one embodiment, the extended instruction tag 304 indicates that accompanying parts 301–303, 305 of a corresponding extended instruction 300 prescribe an extended operation to be performed by the microprocessor. The extended prefix 305 prescribes a supplemental portion of the extended operation, that is, the portion of the operation beyond that provided for by the microprocessor instruction set.

To summarize the instruction extension technique according to the present invention, an instruction extension is configured from one of the opcodes/instructions 304 in an existing instruction set architecture and an n-bit extended features prefix 305. The selected opcode instruction serves as an indicator 304 that the instruction 300 is an extended instruction 300 (that is, it prescribes extensions to the microprocessor architecture), and the n-bit features prefix 305 specifies an extended architecture feature to be employed during execution of the extended instruction 300. In one embodiment, the extended prefix 305 is 8-bits in size, providing for the specification of up to 256 different architectural additions to the processing of current instructions in an existing instruction set. An n-bit prefix embodiment provides for the specification of up to $2^n$ different additional features to be employed during execution of a specified operation.

Now turning to FIG. 4, a table 400 is presented showing how extended architectural features are mapped to logic states of bits in an 8-bit extended prefix embodiment according to the present invention. Similar to the opcode map 200 discussed with reference to FIG. 2, the table 400 of FIG. 4 presents an exemplary 8-bit prefix map 400 that associates up to 256 values of an 8-bit prefix entity 305 with corresponding architectural features 401 (e.g., E34, E4D, etc.), or architectural enhancements 401, of a conforming microprocessor. In the case of an x86 embodiment, the 8-bit extended feature prefix 305 according to the present invention serves to provide for architectural extensions 401 (i.e., E00-EFF) above and beyond those provided for by the current x86 instruction set architecture. In one embodiment, extended prefixes 305 are mapped to features 401 that enable conditional instruction execution. An alternative embodiment provides for increasing the number of architectural registers in a microprocessor, say from 16 registers to 32 registers. Additional embodiments enable architectural features 401 such as selective control of write back of condition codes, selective control of memory attributes (e.g., write protect, write back, write combine) on a per-instruction basis, extended address size (i.e., 64-bit, 128-bit, 256-bit), extended operand size (i.e., 64-bit, 128-bit, 256-bit), suppression of store checking, suppression of interrupts, and selective control of results write back. Like the prefixes 101 described with reference to FIGS. 1 and 2, the extended prefix 305 according to the present invention enables a specified architectural feature 401 like those described above to be applied during the execution of an operation that is prescribed the opcode entity 302. A dual-opcode embodiment provided for by the present invention selects one specific prefix state 401 which indicates that following opcode entities 302 take on an entirely new translation meaning. Such an embodiment is employed in a dual-architecture microprocessor design to execute more than one instruction set.

The extended features 401 shown in FIG. 4 are depicted generically rather than specifically because the technique according to the present invention is applicable to a variety of different architectural extensions 401 and specific instruction set architectures. One skilled in the art will appreciate that many different architectural features 401, a few of which are noted above, can be incorporated into an existing instruction set according to the escape tag 304/extended prefix 305 technique described herein. The 8-bit prefix embodiment of FIG. 4 provides for up to 256 different features 401, however, an n-bit prefix embodiment can allow for programming of up to $2^n$ different features 401.

Now referring to FIG. 5, a block diagram is presented illustrating a pipeline microprocessor 500 for executing extended instructions 300 according to the present invention. The microprocessor 500 has three notable stage categories: fetch, translate, and execute. The fetch stage has fetch logic 501 that retrieves instructions from an instruction cache 502 or external memory 502. The retrieved instructions are provided to the translate stage via an instruction queue 503. The translate stage has translation logic 504 that is coupled to a micro instruction queue 506. The translation logic 504 includes extended translation logic 505. The execute stage has execution logic 507 having extended execution logic 508 therein.

In operation, the fetch logic 501 retrieves formatted instructions according to the present invention from the instruction cache/external memory 502, and places these instructions in the instruction queue 503 in execution order. The instructions are retrieved from the instruction queue 503 and are provided to the translation logic 504. The translation logic 504 translates/decodes each of the provided instructions into a corresponding sequence of micro instructions that direct the microprocessor 500 to perform the operations prescribed by the instructions. The extended translation logic 505 detects those instructions having the extended prefix tag according to the present invention and also provides for translation/decoding of corresponding extended prefixes. In an x86 embodiment, the extended translation logic 505 is configured to detect an extended prefix tag of value F1H, which is the x86 ICE BKPT opcode. Micro instruction fields are provided in the micro instruction queue 506 to enable/disable architectural features that are prescribed within extended instructions.

The micro instructions are provided from the micro instruction queue 506 to the execution logic 507, wherein the extended execution logic 508 detects micro instructions having architectural features enabled as indicated by the micro instruction fields and employs those architectural features during execution of the operations prescribed by the micro instructions.

One skilled in the art will appreciate that the microprocessor 500 described with reference to FIG. 5 is a simplified representation of a present day pipeline microprocessor 500. In fact, a present day pipeline microprocessor 500 comprises upwards to 20–30 different pipeline stages. However, these stages can be generally categorized into those three stage groups shown in the block diagram and thus, the block diagram 500 of FIG. 5 serves to teach the essential elements that are required to implement embodiments of the present invention as described hereinabove. Those extraneous elements of a microprocessor 500, for clarity sake, are not depicted for discussion. For example, in an embodiment that increases the number of architectural registers (not shown) in the microprocessor 500 beyond the number provided for by an existing instruction set architecture will necessarily provide an extended register file (not shown) and corresponding read/write logic (not shown) as part of the extended execution logic 508. Embodiments dealing with extended address/operand size modes will comprise those extended elements that are required to calculate extended addresses and perform operations on and transfer extended operands.

Figure 6:
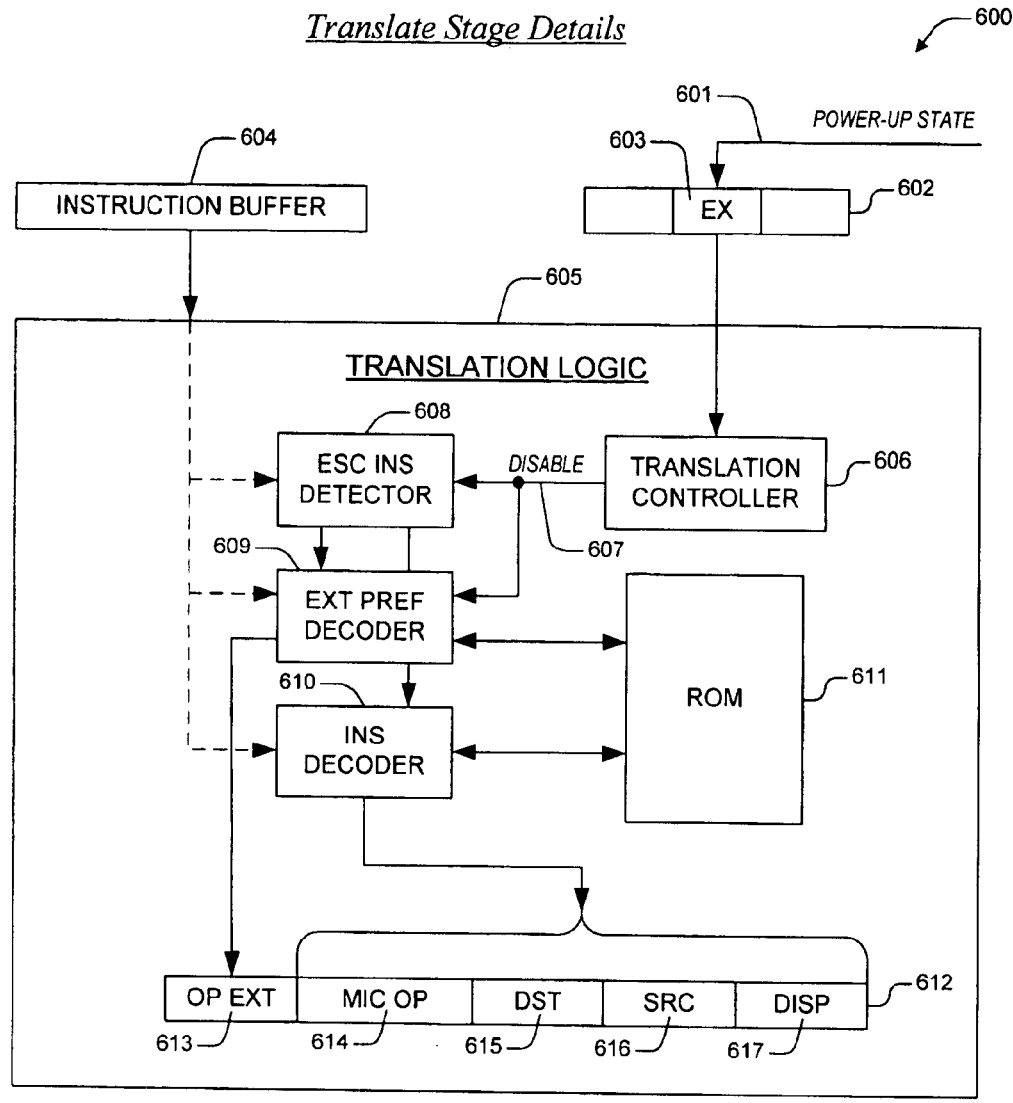
FIG. 6 is a block diagram featuring details of translate stage logic within the microprocessor of FIG. 5.

Turning now to FIG. 6, a block diagram is presented featuring details of translate stage logic 600 within the microprocessor of FIG. 5. The translate stage logic has an instruction buffer 604 that provides an extended instruction according to the present invention to translation logic 605. The translation logic 605 is coupled to a machine specific register 602 that has an extended features field 603. The translation logic 605 has a translation controller 606 that provides a disable signal 607 to an escape instruction detector 608 and an extended prefix decoder 609. The escape instruction detector 608 is coupled to the extended prefix decoder 609 and an instruction decoder 610. The extended prefix decoding logic 609 and the instruction decoding logic 610 access a control read-only memory (ROM) 611, wherein are stored template micro instruction sequences that correspond to some of the extended instructions. The translation logic 605 also has a micro instruction buffer 612 having an opcode extension field 613, a micro opcode field 614, a destination field 615, a source field 616, and a displacement field 617.

Operationally, during power-up of the microprocessor, the state of the extended field 603 within the machine specific register 602 is established via signal power-up state 601 to indicate whether the particular microprocessor is capable of translating and executing extended instructions according to the present invention. In one embodiment, the signal 601 is derived from a feature control register (not shown) that reads a fuse array (not shown) that was configured during fabrication of the part. The machine specific register 602 provides the state of the extended features field 603 to the translation controller 606. The translation control logic 606 controls whether or not instructions from the instruction buffer 604 are translated according to extended instruction rules or according to existing instruction rules. Such a control feature is provided to allow supervisory applications (e.g., BIOS) to enable/disable extended execution features of the microprocessor. If extended execution is disabled, then instructions having the opcode state selected as the extended features tag would be translated according to existing translation rules. In an x86 embodiment having opcode state F1H selected as the tag, then an occurrence of F1H under conventional translation would result in an illegal instruction exception. Under extended translation rules, however, occurrence of the tag would be detected by the escape instruction detector 608. The escape instruction detector 608 would accordingly disable operation of the instruction decoder 610 during translation/decode of a following extended prefix by the extended prefix decoder 609 and would enable the instruction decoder 610 for translation/decode of the remaining parts of the extended instruction. Certain instructions would cause access to the control ROM 611 to obtain corresponding micro instruction sequence templates. The opcode extension field 613 of the micro instruction buffer 612 is configured by the prefix decoder 609 and the remaining buffer fields 614–617 are configured by the instruction decoder 610. Configured micro instructions 612 are provided to a micro instruction queue (not shown) for subsequent execution by the processor.

Figure 7:
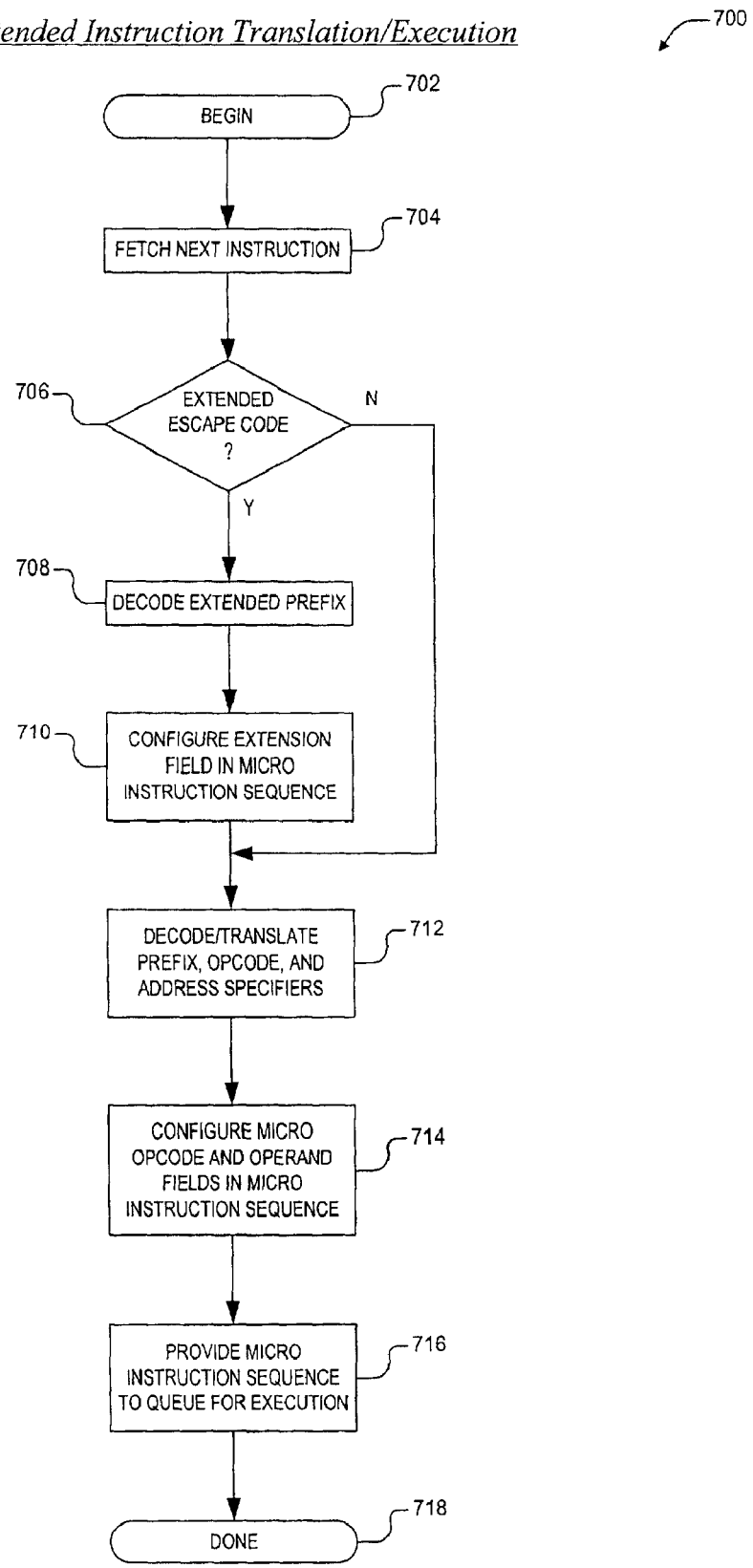
FIG. 7 is a flow chart depicting a method for translating and executing extended instructions according to the present invention.

Now referring to FIG. 7, a flow chart 700 is shown depicting a method for translating and executing extended instructions according to the present invention. Flow begins at block 702 wherein a program configured with extended instructions is provided to a microprocessor. Flow then proceeds to block 704.

At block 704, a next instruction is fetched from cache/memory. Flow then proceeds to decision block 706.

At decision block 706, the next instruction fetched in block 704 is evaluated to determine whether or not it contains an extended escape tag/code. If not, then flow proceeds to block 712. If the extended escape code is detected, then flow proceeds to block 708.

At block 708, translation/decoding is performed on an extended features prefix that follows the escape code detected in block 706. Flow then proceeds to block 710.

At block 710, corresponding fields of a micro instruction sequence are configured to indicate extended architectural features that are enabled/disabled as prescribed by the extended prefix. Flow then proceeds to block 712.

At block 712, the remaining parts of the instruction (e.g., prefix entities, opcode, address specifiers) are translated/decoded to determine the operation to be performed along with associated operand attributes. Flow then proceeds to block 714.

At block 714, remaining fields of a micro instruction sequence are configured to prescribe the specified operation along with its operand specifications. Flow then proceeds to block 716.

At block 716, the micro instruction sequence, comprising the opcode extension field configured in block 710 along with the remaining fields configured in block 714, is provided to a micro instruction queue for execution by the microprocessor. Flow then proceeds to block 718.

At block 718, the method completes.

Although the present invention and its objects, features, and advantages have been described in detail, other embodiments are encompassed by the invention as well. For example, the present invention has been described in terms of a technique that employs a single, unused, opcode state within a completely full instruction set architecture as a tag to indicate that an extended feature prefix follows. But the scope of the present invention is not limited in any sense to full instruction set architectures, or unused instructions, or single tags. On the contrary the present invention comprehends instruction sets that are not entirely mapped, embodiments having used opcodes, and embodiments that employ more than one instruction tag. For example, consider an instruction set architecture where there are no unused opcode states. One embodiment of the present invention comprises selecting an opcode state that is presently used as the escape tag, where the selection criteria is determined according to market-driven factors. An alternative embodiment comprehends employing a peculiar combination of opcodes as the tag, say back-to-back occurrences of opcode state 7FH. The essential nature of the present invention thus embodies use of a tag sequence followed by an n-bit extension prefix that causes extended architectural features to be employed in an operation specified by an extended instruction.

In addition, although a microprocessor setting has been employed to teach the present invention and its features and advantages, one skilled in the art will appreciate that its scope extends beyond the boundaries of microprocessor architecture to include all forms of programmable devices such as signal processors, industrial controllers, array processors, and the like.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus for extending a microprocessor instruction set, comprising:
   translation logic, for translating an extended instruction into corresponding micro instructions, wherein said extended instruction comprises:
      an extended prefix, for directing that an architectural extension be employed in the execution of an operation prescribed by said extended instruction; and
      an extended instruction tag, for indicating said extended instruction prefix, wherein said extended instruction tag is an otherwise architecturally specified opcode within the microprocessor instruction set, and wherein said extended instruction tag comprises opcode F1 (ICE BKPT) in the x86 instruction set; and
   extended execution logic, coupled to said translation logic, for receiving said corresponding micro instructions, and for employing said architectural extension in the execution of said operation.

2. The apparatus as recited in claim 1, wherein said extended instruction further comprises architecturally specified data entities according to the microprocessor instruction set.

3. The apparatus as recited in claim 2, wherein said architecturally specified data entities comprise:
   an opcode entity, for prescribing said operation.

4. The apparatus as recited in claim 3, wherein said extended prefix prescribes information required to employ said architectural extension in the execution of said operation.

5. The apparatus as recited in claim 2, wherein said extended prefix comprises a plurality of bits, and wherein logic states of said plurality of bits prescribe a plurality of architectural extensions to the microprocessor instruction set.

6. The apparatus as recited in claim 1, wherein said extended prefix comprises 8 bits.

7. The apparatus as recited in claim 1, wherein said corresponding micro instructions comprise a micro opcode field and a micro opcode extension field.

8. The apparatus as recited in claim 7, wherein said extended execution logic employs said micro opcode extension field to determine said architectural extension, and wherein said extended execution logic employs said micro opcode field to determine said operation.

9. The apparatus as recited in claim 1, wherein said translation logic comprises:
   escape instruction detection logic, for detecting said extended instruction tag; and
   extended prefix decoding logic, coupled to said escape instruction detection logic,
      for translating said extended prefix, and for configuring a micro opcode extension field within said corresponding micro instructions, said micro opcode extension field prescribing said architectural extension.

10. The apparatus as recited in claim 9, wherein said translation logic further comprises: instruction decoding logic, for configuring other fields within said corresponding micro instructions, said other fields prescribing said operation according to the microprocessor instruction set.

11. In a microprocessor, an instruction extending mechanism, comprising:
   an instruction extension, configured to direct the microprocessor to utilize an extended architecture feature during execution of a specified operation, wherein said instruction extension comprises one of the instructions in an instruction set architecture followed by an n-bit extended features prefix, said one of the instructions indicating said instruction extension and said n-bit extended features prefix indicating said extended architecture feature, wherein said one of the instructions comprises instruction ICE BKPT (i.e., opcode F1) in the x86 instruction set architecture; and
   a translator, configured to receive said instruction extension, and configured to generate a sequence of micro instructions, said sequence directing extended execution logic to utilize said extended architecture feature during execution of said specified operation.

12. The instruction extending mechanism as recited in claim 11, wherein said instruction extending mechanism further comprises:
   a plurality of instruction parts, coupled to said instruction extension, configured to prescribe said specified operation.

13. The instruction extending mechanism as recited in claim 12, wherein said plurality of instruction parts are formatted in accordance with said instruction set architecture.

14. The instruction extending mechanism as recited in claim 11, wherein values of said n-bit extended features prefix are mapped to a plurality of extended architecture features that supplement said instruction set architecture.

15. The instruction extending mechanism as recited in claim 11, wherein said n-bit extended features prefix comprises 8 bits.

16. The instruction extending mechanism as recited in claim 11, wherein said sequence of micro instructions comprises a micro opcode field and a micro opcode extension field.

17. The instruction extending mechanism as recited in claim 16, wherein said micro opcode field directs said extended execution logic to perform said specified operation and said micro opcode extension field directs said execution logic to utilize said extended architecture feature.

18. The instruction extending mechanism as recited in claim 11, wherein said translator comprises:
   an escape instruction detector, for detecting said one of the instructions; and
   an extended prefix decoder, coupled to said escape instruction detector, for translating said n-bit extended features prefix, and for generating a micro opcode extension field within said sequence of micro instructions.

19. An instruction set extension apparatus, comprising:
   an escape tag, for reception by a microprocessor translator, and for indicating that accompanying parts of a corresponding instruction prescribe an extended operation to be performed by a microprocessor, wherein said escape tag is an existing instruction within a microprocessor instruction set, and wherein said existing instruction comprises instruction ICE BKPT (i.e., opcode F1) in the x86 microprocessor instruction set; and
   an extended features specifier, coupled to said escape tag and being one of said accompanying parts, for prescribing a supplemental portion of said extended operation, said supplemental portion being supplemental to that provided for by said microprocessor instruction set.

20. The instruction set extension apparatus as recited in claim 19, wherein the remainder of said accompanying parts are configured according to said microprocessor instruction set to prescribe a basic portion of said extended operation, and wherein said basic portion and said supplemental portion together prescribe said extended operation.

21. The instruction set extension apparatus as recited in claim 20, wherein the remainder of said accompanying parts comprise an opcode byte and optional address specifier bytes.

22. The instruction set extension apparatus as recited in claim 19, wherein said extended features specifier comprises an 8-bit data entity.

23. The instruction set extension apparatus as recited in claim 19, wherein said microprocessor translator translates said escape tag and said accompanying parts into corresponding micro instructions that direct extended execution logic to perform said extended operation.

24. The instruction set extension apparatus as recited in claim 19, wherein said microprocessor translator comprises:
   escape tag detection logic, for detecting said escape tag, and for directing that said accompanying parts be translated according to extended translation conventions; and
   decoding logic, coupled to said escape tag detection logic, for performing translation of microprocessor instructions according to conventions of said microprocessor instruction set, and for performing translation of said accompanying parts according to said extended translation conventions to enable said extended operation.

25. A method for extending a microprocessor instruction set, comprising:
   providing an extended instruction, the extended instruction including an extended tag along with an extended prefix, wherein the extended tag is one of the instructions in the microprocessor instruction set, and wherein said providing comprises using the one of the instructions from the x86 microprocessor instruction set as the extended tag, and said using comprises selecting the x86 ICE BKPT (i.e., opcode F1) instruction as the extended tag;
   prescribing, via the extended prefix and remaining parts of the extended instruction, an extended operation to be performed, wherein the extended operation employs an architectural feature of a microprocessor that cannot be prescribed by the instructions in the microprocessor instruction set; and
   employing the architectural feature in execution of the extended operation.

26. The method as recited in claim 25, wherein said prescribing comprises:
   first specifying a conventional portion of the extended operation, said first specifying employing another of the instructions in the microprocessor instruction set; and
   second specifying a supplemental portion of the extended operation, said second specifying employing the extended prefix.

27. The method as recited in claim 25, wherein said providing comprises employing an extended prefix that has a size of 8 bits.

28. The method as recited in claim 25, wherein said employing comprises:
   translating the extended instruction into micro instructions that direct the microprocessor to perform the extended operation; and
   within extended execution logic, executing the micro instructions to perform the extended operation.

29. The method as recited in claim 28, wherein said translating comprises:
   within translation logic, detecting the extended tag; and
   decoding the extended prefix and remaining parts of the extended instruction according to extended translation rules.

* * * * *